United States Patent
Winkler

(10) Patent No.: US 7,008,357 B2
(45) Date of Patent: Mar. 7, 2006

(54) SEAT EXERCISE DEVICE

(75) Inventor: Edward R. Winkler, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 09/982,341

(22) Filed: Oct. 18, 2001

(65) Prior Publication Data

US 2003/0078145 A1    Apr. 24, 2003

(51) Int. Cl.
A63B 26/00    (2006.01)
(52) U.S. Cl. .................. 482/142; 482/148; 482/79; 297/5
(58) Field of Classification Search ............. 482/142, 482/51, 79–80, 121–129, 140, 130; D21/662; 297/5, 68–71, 76, 423.1, 423.17, 423.19, 297/423.22, 423.24, 423.25, 423.34, 423.35, 297/423.36

See application file for complete search history.

(56) References Cited

U.S. PATENT DOCUMENTS

| | | | |
|---|---|---|---|
| 2,718,396 A | | 9/1955 | Lateau et al. |
| 3,738,649 A | * | 6/1973 | Miller .................... 482/57 |
| 4,111,416 A | | 9/1978 | Jinotti |
| 4,838,547 A | * | 6/1989 | Sterling ................ 482/128 |
| 5,104,363 A | * | 4/1992 | Shi ....................... 482/73 |
| 5,713,821 A | | 2/1998 | Nissen |
| 5,782,893 A | | 7/1998 | Dennis, III |
| 5,851,166 A | * | 12/1998 | Bernardson ............. 482/79 |
| 6,002,965 A | | 12/1999 | Katz |
| 6,048,292 A | * | 4/2000 | Gasquez ................ 482/130 |
| 6,282,448 B1 | | 8/2001 | Katz |

FOREIGN PATENT DOCUMENTS

| | | | |
|---|---|---|---|
| DE | | 545820 | * 3/1932 |
| WO | WO 01/47464 A1 | | 7/2001 |

* cited by examiner

Primary Examiner—Gregory L. Huson
Assistant Examiner—L. Amerson
(74) Attorney, Agent, or Firm—Harness Dickey & Pierce P.L.C.

(57) ABSTRACT

A seat exercise device for use onboard a mobile platform such as a commercial aircraft is disclosed, wherein a passenger engages the exercise device while seated to reduce the risk of deep vein thrombosis (DVT) during extended periods of travel. The preferred embodiment of the present invention comprises a leg support secured to a passenger seat and a foot support secured to a lower end of the leg support. A trombone spring is secured between the leg support and the foot support such that a passenger may push down on the foot support to flex and contract thigh muscles. Additionally, a pivot spring is secured between the leg support and the foot support such that a passenger may pivot the foot support to flex and contract calf muscles. Accordingly, the flexing and contracting of leg muscles increases blood circulation and reduces the risk of DVT during long flights.

15 Claims, 3 Drawing Sheets

SEAT EXERCISE DEVICE

FIELD OF THE INVENTION

The present invention relates generally to exercise devices and more particularly to exercise devices for increasing blood circulation to reduce the risk of deep vein thrombosis (DVT).

BACKGROUND OF THE INVENTION

With the increased duration of commercial flights and the extended periods during which passengers remain sedentary, a growing number of passengers are becoming susceptible to deep vein thrombosis (DVT). Generally, DVT is a condition that occurs when a blood clot forms in a deep vein in the leg. The clot may break loose and travel to the heart and lungs, which may block an artery in a lung, thereby causing a pulmonary embolism. Further, large blockages that restrict blood flow from the right side of the heart to the lungs can result in sudden death.

Unfortunately, the reduced level of activity during extended periods of travel onboard a mobile platform such as a commercial aircraft, train, or bus, among others, increases the risk of DVT. DVT has become well known in commercial air travel and is commonly referred to as "economy-class syndrome" due to the relatively closely spaced seats, narrow aisles, and reduced opportunities to increase blood circulation during flight. According to one known clinical study, the estimated incidence is one per 1,000 persons per year. Additionally, as many as 600,000 persons are hospitalized in the U.S. alone as a result of DVT. In Britain, a recent British medical study reported that 2,000 people die from DVT each year. Similarly, in Japan, 25 people have died of DVT in airports over the last 8 years. Obviously, DVT has become a significant health concern for passengers and crew members, especially passengers of all ages, on long-haul flights.

To reduce the risk of DVT, passengers may choose to leave their seats and walk throughout the aisles of the aircraft to exercise and increase blood circulation. However, passengers are strongly encouraged to remain seated with seat belts fastened throughout the flight to reduce the risk of injury as a result of turbulence or other abrupt maneuvering of the aircraft. Additionally, passengers walking through the aisles often disrupt duties of the flight crew due to the limited amount of space. Therefore, the need for passengers to remain seated with their seatbelts fastened during the flight conflicts with the need to increase blood circulation and reduce the risk of DVT. Accordingly, any activity to reduce the risk of DVT should be conducted while the passenger or crew member is seated if at all possible.

One known art exercise device for use onboard airlines while seated is the "Airogym™," which is a portable, inflatable two-compartment bag that is placed on the floor underneath the feet of a passenger. The passenger positions various parts of their feet, such as the toes or heels, on each side of the bag and presses accordingly to work various muscle groups such as the calves or thighs. Although the Airogym™ may be effective in reducing the risk of DVT, the device must be purchased by the passenger and brought onboard the aircraft. Not every passenger has the means to purchase such a device, especially if the passenger is not a frequent traveler. Additionally, since the device is not secured within the cabin area, a chance of the device tumbling through the cabin exists, especially during turbulent conditions, and may cause bothersome disruptions and even unsafe conditions for other passengers and crew members.

Yet another known device the disclosed in U.S. Pat. Nos. 6,282,448 and 6,002,965 to Katz et al., wherein a device is strapped to, for example, a calf area of a user and electrodes supply muscle and nerve stimulation, which results in contraction of the calf muscle and thus a reduced risk of DVT or pulmonary embolism. Additionally, U.S. Pat. No. 5,782,893 to Dennis III discloses a neuromuscular electrical vibrator for reducing the risk of DVT, which is secured to a muscle area by a self-adhering conductive electrode. Similar to the Airogym™, however, the devices of Katz et al. and Dennis III must be purchased by the passenger and brought onboard the aircraft.

Accordingly, there remains a need in the art for an exercise device onboard mobile platforms such as commercial aircraft to reduce the risk of DVT, which is employed while a passenger or crew member remains seated during transit. A need further exists for an exercise device that is secured within the mobile platform, for example, the cabin of a commercial aircraft, such that passengers or crew members need not separately purchase and bring exercise devices onboard the aircraft for each flight.

SUMMARY OF THE INVENTION

In one preferred form, the present invention provides an exercise device secured within a mobile platform, e.g., within a passenger cabin of a commercial aircraft, wherein a passenger engages the exercise device to increase blood circulation, thereby reducing the risk of deep vein thrombosis (DVT). The exercise device is preferably a resistance device such that as a passenger applies pressure or pushes against the exercise device, the exercise device resists the applied pressure. Alternately, the exercise device may be a pressure applicator or an electrical vibrator, among other devices and methods commonly known in the art, which generally operate to increase blood circulation.

The resistance device generally comprises a leg support secured to a passenger seat and a foot support secured to a lower end of the leg support. A trombone spring is disposed between the leg support and the foot support such that as the passenger presses down against the foot support, the trombone spring provides resistance to flex and contract thigh muscles. Similarly, a pivot spring is disposed between the leg support and the foot support such that as the passenger pivots the foot support with a foot, (by pivoting an ankle and pressing down against the foot support with their toes), the pivot spring provides resistance to flex and contract calf muscles. Accordingly, as the muscles are flexed and contracted, blood circulation improves and the risk of DVT is reduced through the use of the exercise device of the present invention.

Although in one form the exercise device is operated manually by a passenger, an automated control system may be employed such that the muscles of the passenger are stimulated automatically at predetermined time intervals throughout the flight. Furthermore, the leg support may also be translatable such that a variety of passengers may be accommodated with different lower leg heights.

In yet another form, the present invention provides a method of increasing passenger circulation during transit, wherein an exercise device is engaged by the passenger while the passenger is seated, and the exercise device causes leg muscles (e.g., thigh, calf) to flex and contract, thereby improving circulation and reducing the risk of DVT. Accordingly, a foot support is engaged such that a trombone spring provides resistance to flex and contract thigh muscles, and such that a pivot spring provides resistance to flex and contract calf muscles. As a result, the method according to the present invention increases blood circulation and reduces the risk of DVT.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
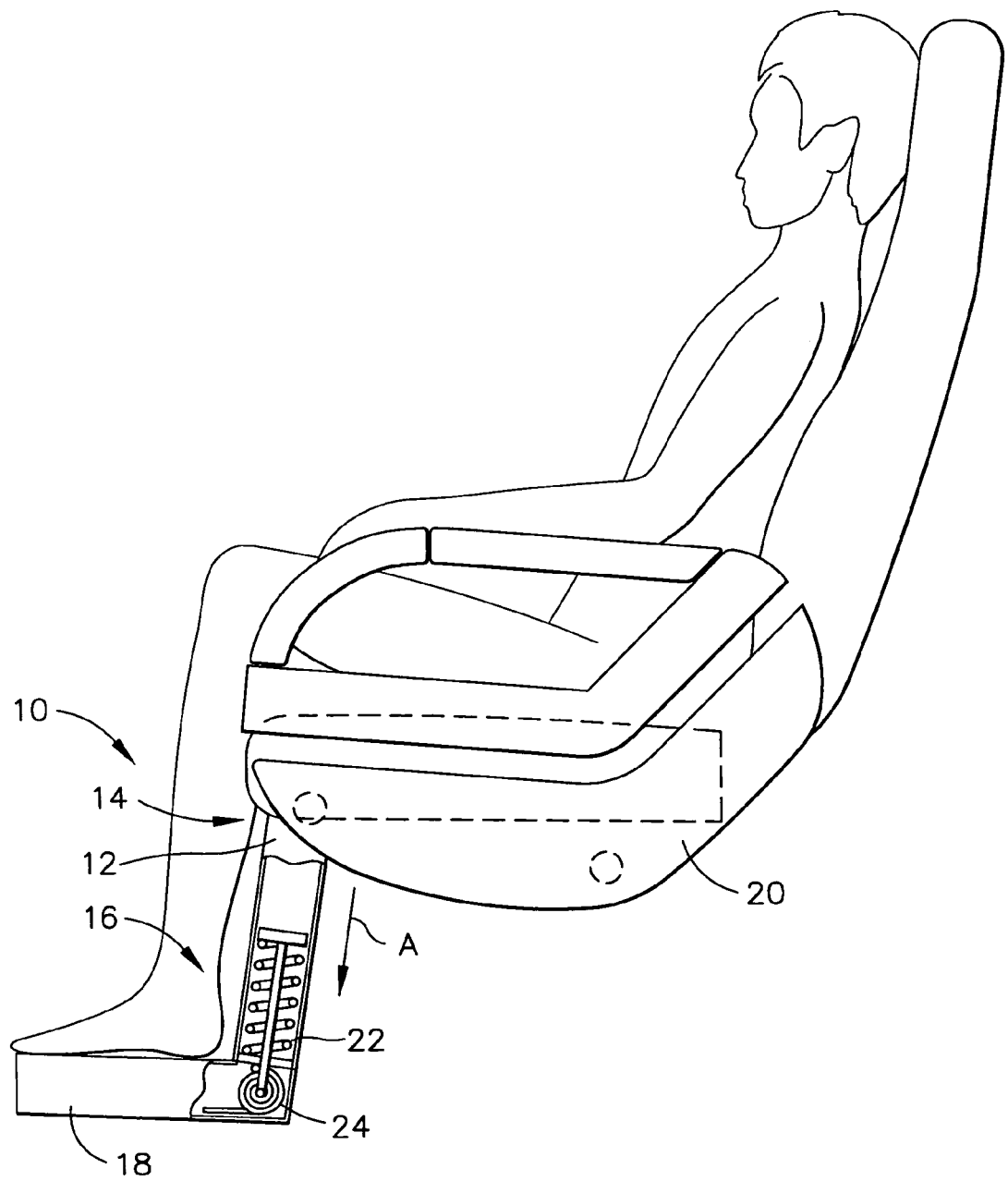
FIG. 1 is a side view of an exercise device in accordance with the present invention.

Referring to the drawings, an exercise device according to the present invention is illustrated and generally indicated by reference numeral 10 in FIG. 1. As shown, the exercise device comprises a leg support 12 defining an upper end 14 and a lower end 16, and a foot support 18 secured to the lower end 16 of the leg support 12. Preferably, the upper end 14 of the leg support 12 is secured to a passenger seat 20, which may be the seat of a passenger using the exercise device 10 or the seat immediately in front of the passenger using the exercise device 10 (not shown), among other appropriate locations throughout the cabin. Further, the leg support 12 may be pivotably secured to the passenger seat 20 at the upper end 14 to provide additional range of motion for the passenger. Moreover, the leg support 12 may be translatable (not shown) in the direction of arrow A in order to accommodate a wide range of passenger leg heights.

Although the detailed description herein is directed to a passenger seat 20, the exercise device 10 may also be employed by other crew members in their respective seating areas. For example, the exercise device 10 may be secured to the seat of a pilot and/or first officer (not shown) such that the pilot and/or first officer may exercise and increase blood circulation during long-haul flights. Similarly, the exercise device 10 may be secured to a jump seat (not shown) where crew members or airline employees often sit during a flight. Accordingly, the exercise device 10 may be secured to a plurality of locations throughout a mobile platform (e.g., commercial aircraft, bus, train, automobile) for use by any person sitting onboard. Additionally, the reference to "passengers" herein shall be understood by those skilled in the art to mean any person onboard the mobile platform, e.g. crew members, pilots, and passengers, among others.

As further shown, a trombone spring 22 is disposed between the leg support 12 and the foot support 18 to provide resistance as the passenger presses down against the foot support 18 as described in greater detail below. Additionally, a pivot spring 24 is also disposed between the leg support 12 and the foot support 18 to provide resistance as the passenger pivots the foot support 18 as further described below. Accordingly, the trombone spring 22 provides resistance to flex and contract thigh muscles, and the pivot spring 24 provides resistance to flex and contract calf muscles, which results in improved blood circulation and a reduced risk of deep vein thrombosis (DVT).

Figure 2:
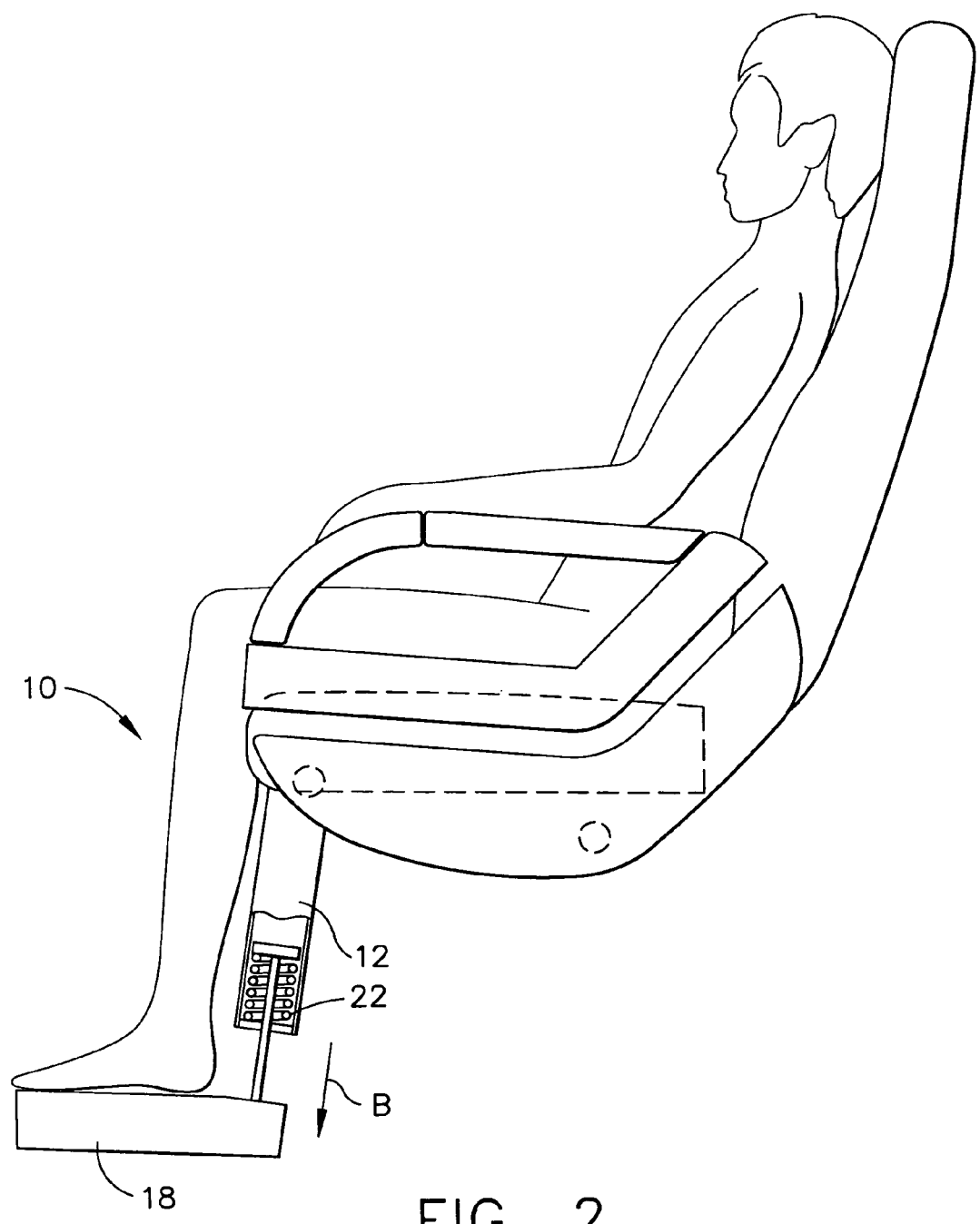
FIG. 2 is a side view of an exercise device with a trombone spring extended in accordance with the present invention.

Referring to FIG. 2, the exercise device 10 is illustrated with the trombone spring 22 extended and the foot support 18 pressed down in the direction of arrow B, which occurs as the passenger presses down against the foot support 18. As a result, the thigh muscles of the passenger are flexed and contracted as the foot support 18 is pressed down in the direction of arrow B and released, respectively, such that blood circulation is increased through the legs of the passenger. Additionally, the leg support 12 provides support to the legs of the passenger during use of the exercise device 10.

Figure 3:
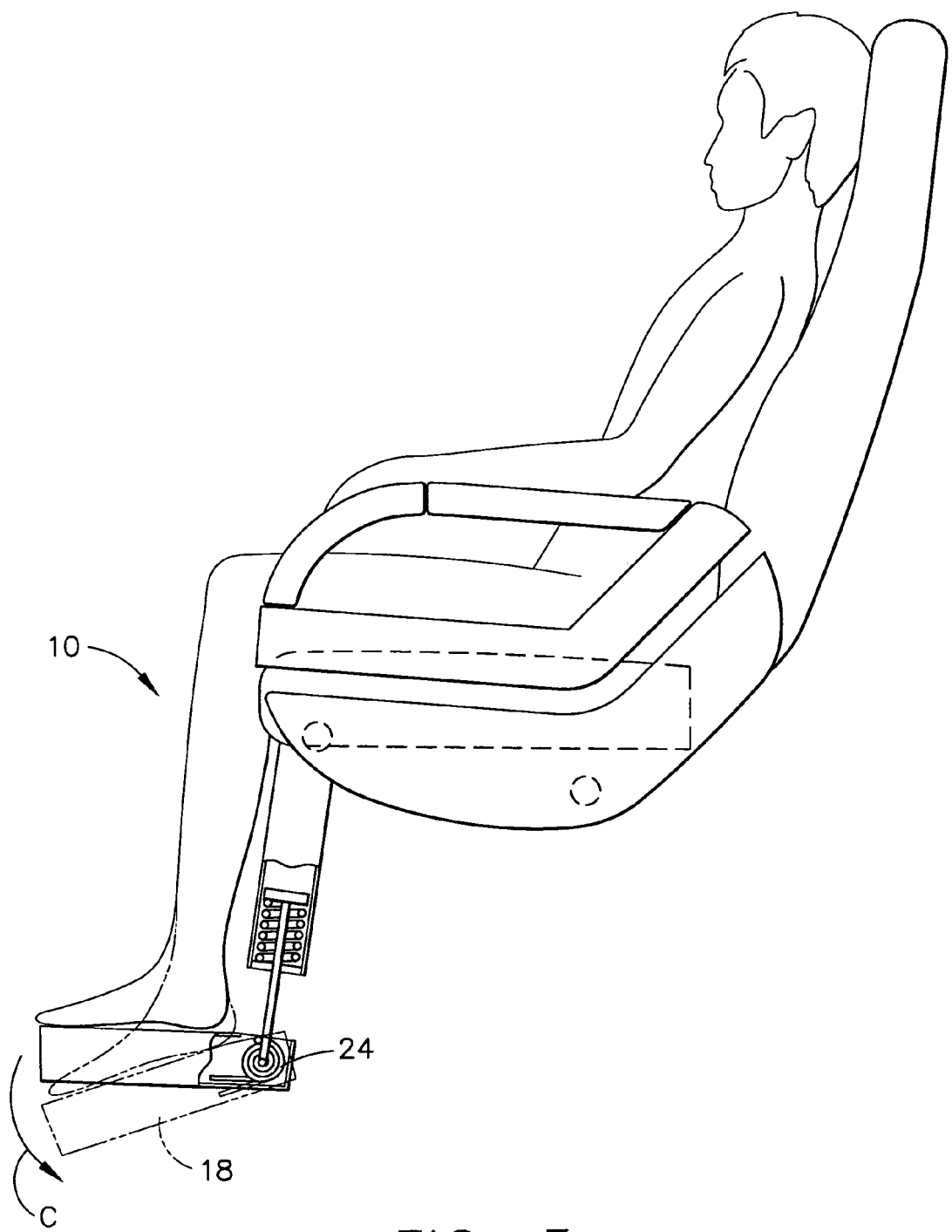
FIG. 3 is a side view of an exercise device with a pivot spring extended in accordance with the present invention.

Referring now to FIG. 3, the exercise device 10 is illustrated with the pivot spring 24 extended and the foot support 18 pivoted in the direction of arrow C, which occurs as the passenger pivots their ankles and applies pressure with their toes to the foot support 18. As a result, the calf muscles of the passenger are flexed and contracted as the foot support 18 is pivoted in the direction of arrow C and released, respectively, such that blood circulation may be increased through the legs of the passenger.

In operation, therefore, the foot support 18 may be engaged in a downward and upward motion to flex and contract thigh muscles, and may further be engaged in a pivoting motion to flex and contract calf muscles. Moreover, the passenger may choose to flex and contract thigh and calf muscles simultaneously rather than to flex the respective muscles in separate exercises.

Preferably, the leg support 12 and the foot support 18 are padded for added comfort to the passenger, however, surfaces of the leg support 12 and the foot support 18 that contact the calf and foot of the passenger may alternately be hard surfaces. In one form, the leg support 12 and the foot support 18 are fabricated from a durable, lightweight material such as aluminum. Alternately, the leg support 12 and the foot support 18 may be fabricated from other durable and lightweight materials such as polymer compositions or fiber reinforced polymer compositions, among other materials commonly known in the art. The material for the trombone spring 22 and the pivot spring 24 is preferably hard and durable and may include, by way of example, steel. Furthermore, a retracting mechanism (not shown) may be employed in accordance with methods commonly known in the art such that the exercise device 10 may be folded out of the way during periods of non-use.

Accordingly, the exercise device 10 as described and illustrated herein is a resistance device, such that as a passenger applies force to the exercise device 10, the exercise device 10 provides resistance to the applied force. Alternately, the exercise device 10 may comprise other devices and methods commonly known in the art to increase blood circulation. For example, the exercise device 10 may be a pressure applicator (not shown) that applies pressure to a specific muscle region of the passenger, such as an inflatable bladder integrated with the passenger seat 20 and/or the leg support 12. As a further alternative, the exercise device 10 may be an electrical vibrator (not shown) that stimulates muscles to improve blood circulation. Similarly, the electrical vibrator may be integrated with the passenger seat 20 or other device within a cabin area of a mobile platform. The exercise device 10 may further comprise rollers or heat applicators, among other devices and methods commonly known in the art to increase blood circulation.

In another form, the exercise device 10 may be controlled automatically by a control system (not shown) rather than manually by a passenger as described herein. Accordingly, the exercise device 10 may be activated at regular time intervals throughout the duration of the flight as needed to increase blood circulation so that the passenger is not required to remember to periodically engage the exercise device 10.

Although the detailed description herein is directed to an exercise device wherein the mobile platform is a commercial aircraft, the invention is also applicable to other mobile platforms such as an automobile, ship, train, or bus, among others. Accordingly, the reference to commercial aircraft should not be construed as limiting the scope of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. An exercise device in combination with a seat on a mobile platform, for use by an occupant, wherein the seat occupant engages the exercise device while sitting in the seat to increase blood circulation;
   the exercise device including a resistance device having a leg support operably associated with the passenger seat;
   the leg support defining an upper end and a lower end, the upper end being pivotally secured to the seat;
   a foot support secured to the lower end of the leg support; and
   a spring disposed between the leg support and the foot support,
wherein the foot support is engaged by the seat occupant to flex and contract thigh muscles of the seat occupant against the resistance provided by the spring, while the occupant is traveling on the mobile platform.

2. The exercise device of claim 1, wherein the resistance device comprises:
   a pivot spring disposed between the leg support and the foot support,
wherein the foot support is pivoted by the seat occupant to flex and contract calf muscles of the seat occupant.

3. The exercise device of claim 2 further comprising a retracting mechanism secured to the exercise device, wherein the exercise device may be folded out of the way during periods of non-use.

4. The exercise device of claim 1, wherein the exercise device comprises activated by an automated control system.

5. The exercise device of claim 1, wherein the exercise device comprises a pressure applicator.

6. The exercise device of claim 1, wherein the exercise device comprises an electrical vibrator.

7. The exercise device of claim 1, wherein the exercise device comprises a heat applicator.

8. The exercise device of claim 1, wherein the mobile platform comprises a commercial aircraft.

9. An exercise device in combination with a seat on a mobile platform and for use by an occupant comprising:
   a leg support defining an upper end and a lower end, the upper end being secured within a mobile platform;
   a foot support secured to the lower end of the leg support;
   a trombone spring disposed between the leg support and the foot support; and
   a pivot spring disposed between the leg support and the foot support,
wherein the foot support is engaged and pivoted by a passenger to flex and contract thigh and calf muscles of the passenger while the passenger is seated.

10. The exercise device of claim 9, wherein the leg support is secured to a passenger seat.

11. The exercise device of claim 10, wherein the leg support is pivotably secured to a passenger seat.

12. The exercise device of claim 9, wherein the mobile platform comprises a commercial aircraft.

13. The exercise device of claim 9 further comprising a retracting mechanism secured to the exercise device, wherein the exercise device may be folded out of the way during periods of non-use.

14. An exercise device for use onboard a commercial aircraft during flight, the exercise device comprising:
   a leg support defining an upper end and a lower end, the upper end being secured to a passenger seat;
   a foot support secured to the lower end of the leg support;
   a trombone spring disposed between the leg support and the foot support; and
   a pivot spring disposed between the leg support and the foot support,
wherein the foot support is engaged and pivoted by a passenger to flex and contract thigh and calf muscles of the passenger while the passenger is seated.

15. The exercise device of claim 14 further comprising a retracting mechanism secured to the exercise device, wherein the exercise device may be folded out of the way during periods of non-use.

\* \* \* \* \*